(12) United States Patent
Wylie et al.

(10) Patent No.: US 12,065,281 B2
(45) Date of Patent: Aug. 20, 2024

(54) PALLET BOX ASSEMBLY

(71) Applicants: SSAB WEAR SOLUTIONS LLC, Mobile, AL (US); SSAB TECHNOLOGY AB, Stockholm (SE)

(72) Inventors: Ross Wylie, Mobile, AL (US); Simon Lizotte-Latendresse, Northport, AL (US); Anders Isaksson, Falun (SE); Michal Ciszewski, Wroclaw (PL); Bill Donohue, Mobile, AL (US)

(73) Assignees: SSAB WEAR SOLUTIONS LLC, Mobile, AL (US); SSAB TECHNOLOGY AB, Stockholm (SE)

( * ) Notice: Subject to any disclaimer, the term of this patent is extended or adjusted under 35 U.S.C. 154(b) by 0 days.

(21) Appl. No.: 17/791,325

(22) PCT Filed: Jan. 22, 2021

(86) PCT No.: PCT/EP2021/051520
§ 371 (c)(1),
(2) Date: Jul. 7, 2022

(87) PCT Pub. No.: WO2021/148647
PCT Pub. Date: Jul. 29, 2021

(65) Prior Publication Data
US 2023/0348136 A1      Nov. 2, 2023

Related U.S. Application Data

(60) Provisional application No. 62/964,759, filed on Jan. 23, 2020.

(51) Int. Cl.
*B65D 19/08* (2006.01)
*B60P 1/28* (2006.01)
*B65D 19/38* (2006.01)

(52) U.S. Cl.
CPC .............. *B65D 19/08* (2013.01); *B60P 1/286* (2013.01); *B65D 19/385* (2013.01);
(Continued)

(58) Field of Classification Search
CPC ........ B65D 19/00; B65D 19/02; B65D 19/04; B65D 88/123; B60P 1/286; B60P 1/283
(Continued)

(56) References Cited

U.S. PATENT DOCUMENTS 2,665,020 A * 1/1954 Whittle ................. B60P 1/6454
414/500
4,244,486 A * 1/1981 Ewald, Jr. ............ B65D 88/123
220/4.12
(Continued)

FOREIGN PATENT DOCUMENTS

DE       202010016780        3/2011
FR         2643043 A1        8/1990
(Continued)

OTHER PUBLICATIONS

International Search Report and Written Opinion were mailed on Apr. 23, 2021 by the International Searching Authority for International Application No. PCT/EP2021/051520 filed on Jan. 22, 2021 and published as WO 2021/148647A1 (Applicant—SSAB Wear Solutions LLC) (14 pages).

*Primary Examiner* — Jose V Chen
(74) *Attorney, Agent, or Firm* — Ballard Spahr LLP

(57) ABSTRACT

Described is a pallet box assembly for receiving and transporting heavy and/or high temperature objects. The pallet box assembly includes a tub and frame configured for receiving the tub. The tub has a bottom plate comprising two lateral side portions and at least one upwardly arc-shaped portion therebetween. Each of the two side portions further has a bent section, the bent section forming a longitudinally extending corner portion of the tub, and a substantially vertical section connecting to the bent section, the substantially vertical section reaching upwards from the bent section to align and connect to the respective side plate, wherein the substantially vertical section and the respective side plates further includes a longitudinally extending connection area.

14 Claims, 12 Drawing Sheets

(52) U.S. Cl.
CPC .............. *B65D 2519/00059* (2013.01); *B65D 2519/00273* (2013.01); *B65D 2519/00323* (2013.01); *B65D 2519/00353* (2013.01)

(58) Field of Classification Search
USPC ............................................... 108/55.1, 55.5
See application file for complete search history.

(56) References Cited

U.S. PATENT DOCUMENTS

| | | | | |
|---|---|---|---|---|
| 5,018,629 | A * | 5/1991 | Lamar | B65D 19/08 |
| | | | | 211/49.1 |
| 5,186,351 | A | 2/1993 | Gallo et al. | |
| 6,155,446 | A * | 12/2000 | Alexander | B65D 90/041 |
| | | | | 220/23.91 |
| 6,602,032 | B2 * | 8/2003 | Arai | B65D 19/385 |
| | | | | 108/55.3 |
| 7,918,165 | B2 * | 4/2011 | Owen | B65D 19/44 |
| | | | | 108/55.3 |
| 7,997,213 | B1 * | 8/2011 | Gauthier | B65D 88/022 |
| | | | | 294/67.1 |
| 9,550,442 | B2 * | 1/2017 | Hanson, Jr. | B60P 1/6454 |
| 2013/0220998 | A1 | 8/2013 | Dabritz | |
| 2016/0101894 | A1 * | 4/2016 | Hull | B65D 19/0081 |
| | | | | 108/55.5 |
| 2016/0257445 | A1 * | 9/2016 | Balazs | B65D 19/18 |
| 2023/0001862 | A1 * | 1/2023 | Persson | B60R 13/01 |
| 2023/0145943 | A1 * | 5/2023 | Allen | B60R 11/00 |
| | | | | 298/12 |

FOREIGN PATENT DOCUMENTS

| | | | | |
|---|---|---|---|---|
| GB | | 846542 A | 8/1960 | |
| GB | | 2561912 A | 10/2018 | |
| WO | WO 2010/085201 A1 | | 7/2010 | |
| WO | WO 2013/066172 A1 | | 5/2013 | |
| WO | WO-2015089550 A1 * | | 6/2015 | ............. B60P 1/286 |

* cited by examiner

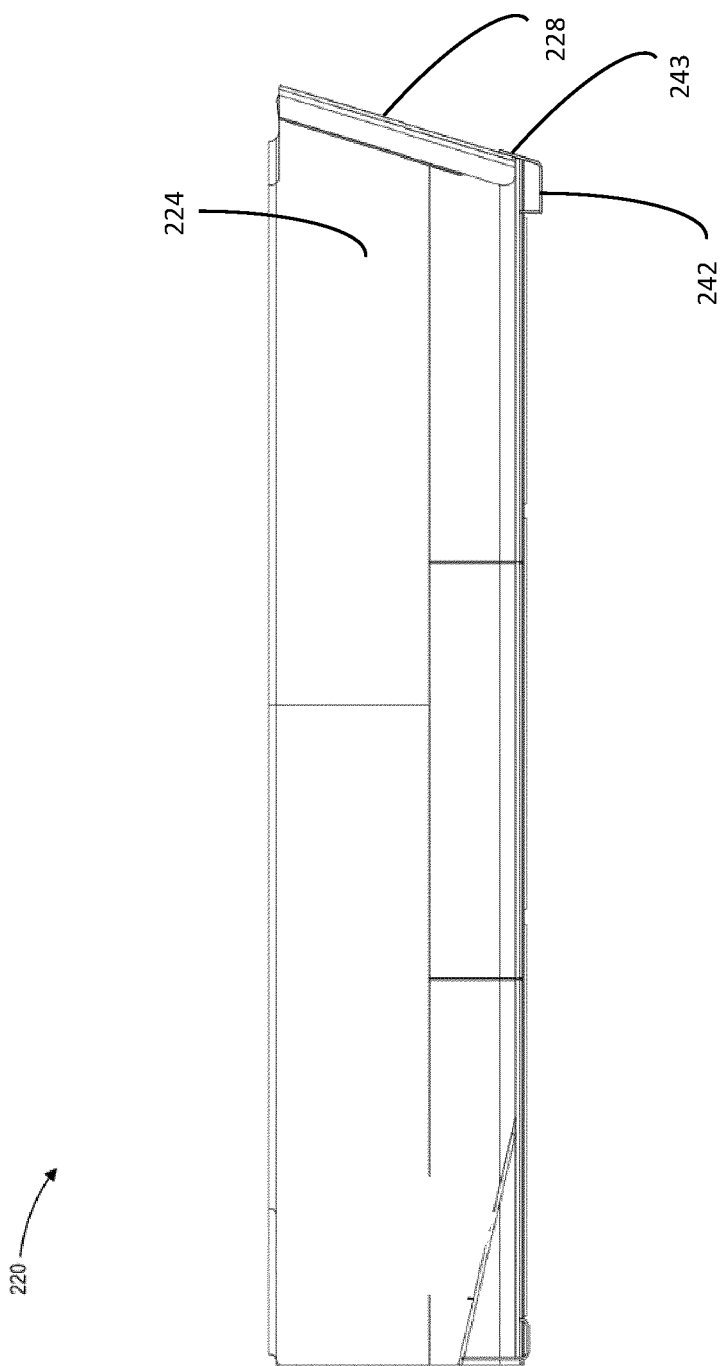

PALLET BOX ASSEMBLY

CROSS-REFERENCE TO RELATED APPLICATIONS

This application is a U.S. National Phase Application of International Application No. PCT/EP2021/051520, filed Jan. 22, 2021, which claims the benefit of U.S. Provisional Application No. 62/964,759, filed Jan. 23, 2020, each of which are hereby incorporated by reference in their entirety.

TECHNICAL FIELD

The present disclosure relates to a pallet box assembly for receiving and transporting heavy and/or high temperature objects. The pallet box assembly comprises a tub and a frame. The present disclosure also relates to a carrier system comprising a carrier, such as a truck or lorry, and a pallet box assembly. The present disclosure also relates to use of a pallet box assembly for receiving and transporting metal mill by-products, such as scrap metal and slag.

BACKGROUND

Pallet box assemblies are traditionally constructed as a unibody structure, with a receptacle portion, such as a tub, for receiving metal mill by-products being inseparable from and integrated with a shell or frame that mounts onto a corresponding rear portion of a truck, lorry or other carrier. During use, a pallet box assembly may be subjected to substantial static and/or dynamic forces caused by the loading and unloading of scrap materials. In addition, some pallet box assemblies may receive high-temperature slag, which can cause localized thermal expansion in the area of the pallet box assembly proximate to the slag. The forces and thermal expansion, and contraction thereafter, can cause the pallet box assembly to become damaged over time, eventually requiring the pallet box assembly to be repaired or replaced. Moreover, some damage may be transferred from the receptacle portion to the shell or frame of the pallet box assembly, e.g., due to thermal expansion, which can compromise the structural integrity of the frame even before the receptacle portion becomes too damaged to use.

SUMMARY

An object of the present disclosure is therefore to, at least to some extent, overcome the problems with the prior art as listed above, or at least to provide a useful alternative.

The above object is achieved by the pallet box assembly according to claim 1.

As such, the present disclosure according to a first aspect relates to pallet box assembly for receiving and transporting heavy and/or high temperature objects, such as metal mill by-products. The pallet box assembly comprises a tub for receiving material and a frame to carry the tub and to be mounted onto a corresponding rear portion of a vehicle, such as a truck, lorry or other carrier. The pallet box assembly has a front end and a rear end separated in a longitudinal direction. The front end is adapted to receive a carrier for transporting the pallet box assembly. The frame comprises at least two top rails and two bottom rails separated in a lateral direction and extending longitudinally, and connecting rails extending in a vertical direction connecting to a respective top rail and bottom rail. As such, the pair of top-, bottom- and its respective connecting rails forms two sides of the frame. The frame comprises lateral rails extending laterally and connecting the respective connecting rails. The lateral rails form the frame's main support for the tub. The tub comprises at least two laterally separated side plates. The side plates extend substantially in a respective vertical/longitudinal plane, thereby forming at least part of side walls of the tub. The tub comprises a bottom plate extending in a lateral/longitudinal plane and connecting to a bottom portion of each respective side plate, thereby forming a bottom surface of the tub. The bottom plate comprises two lateral side portions and at least one upwardly arc-shaped portion therebetween. The two side portions each have a lateral section connecting to the upwardly arc-shaped portion. Each lateral section is adapted to support the tub against the lateral rails of the frame. Each of the two side portions further comprises a bent section connecting to the lateral section. The bent section forms a longitudinally extending corner portion of the tub. Each of the two side portions further comprises a substantially vertical section connecting to the bent section. The substantially vertical section reaching upwards from the bent section to align and connect to the respective side plate. The substantially vertical section and the respective side plates further comprises a longitudinally extending connection area.

A benefit of having a longitudinally extending connection area at a vertical section reaching upwards and away from the bent section forming a corner, is that the connection to the side plate can be done in a less sensitive area. Connection areas may weaken the structural integrity of the plate. This may be due to for instance providing apertures on the plates to connect the plates by bolts/nut connection, or to provide plug welds to the respective plate. Connections made by welding also weakens the structural integrity of the plate also without providing holes, as the welding may result in the formation of a heat-affected zone (HAZ), which is the area of base material that is not melted and that has had its microstructure and properties altered by the welding or cutting operations. The heat from a welding and/or cutting process and subsequent re-cooling may thereby adversely affect the steel around the weld interface and consequently weaken the tub in the connecting area.

The sidewalls of the tub may experience lesser amounts of thermal expansion compared to the bottom surface carrying high-temperature objects. Therefore, the side walls may be better suited to serve as location for connecting the two plates, compared to for instance providing a connection, such as a weld, in the corner portion where the substantially lateral bottom surface and the substantially vertical sidewalls meet.

This is particularly the case when the bottom surface has an upwardly arc-shaped portion. The upwardly arc-shaped portion of the bottom surface is beneficial in multiple aspects. One benefit of having a curvature of the bottom surface is that it may reduce the stresses caused by thermal expansion of the tub on frame, which might otherwise push laterally on the frame and weaken e.g. joints connecting the rails of the frame. In addition, a second benefit is that an upwardly arc-shaped portion of the bottom surface may better disperse impact forces caused by materials being dropped into the tub compared to other pallet box assembly designs having a tub with a flat or non-curved bottom surface. When the impact forces are dispersed, the forces travel down and to the lateral side portions of the bottom plates and into the corner portions of the tub where they are taken up by other structural elements of the tub, such as side walls front and rear/front walls. As such, the corner portions are exposed to even more impact forces when being loaded or stress during transport of the loaded objects, or even stress simply by containing heavy objects, when comprising an upwardly arc shaped portion. If the loaded material is hot, thermal expansion will also affect the corners in addition to the above.

As such, a benefit of having a substantially vertical section connecting to the bent section forming a corner portion, especially in combination with the upwardly arc-shaped portion, is that the structurally weakened area for connecting the plates can be made at an area forming a side wall instead of a bottom surface or a corner portion of the tub, which is exposed to much impact load, stress or thermal expansion, or a combination thereof. Instead, the corner portions can be made in one solid element with higher structural integrity.

It is further advantageous to have a longitudinally extending connection area at vertical section reaching upwards and away from the bent section forming a corner, in that it permits for an efficient assembly process. Aligning plates in a corner to prepare for welding is cumbersome as it regards heavy and bulky plates that requires precision in the alignment to prepare for the welding. Also, as the corner portions are exposed to much stress, they require a high-quality weld. Having the connection area in a less demanding area enables to make use of a less complex weld, thereby facilitating the production step. The welding may instead be done by spot welding or plug welding, which is easier and quicker compared to making one weld along the full connection area. Further, a plug weld allows for increased thermal expansion/movement of plates in between spots, thus does not cause same stress as by having a rigid weld, and may therefore be further advantageous in certain applications, such as when handling hot metal slag.

By longitudinal direction is meant a direction in which the pallet box assembly is intended to be transported. By front end is meant the end adapted to receive a carrier. By rear end is meant the end opposite to the front end in the longitudinal direction. By the term "longitudinal" or "longitudinally", reference is made to the longitudinal direction. By "longitudinally extending" is meant extending in the longitudinal direction.

By lateral direction is meant a direction perpendicular to the longitudinal direction and substantially in level with the extension of the ground, the ground being for instance a road on which the pallet box assembly is intended to be transported. By the term "lateral" or "laterally", reference is made to the lateral direction. By "laterally extending" is meant extending in the lateral direction.

By vertical direction is meant a direction perpendicular to the longitudinal direction and the lateral direction. Thus, the vertical direction may thereby be substantially perpendicular to a plane defined by the ground, the ground being for instance a road on which the pallet box assembly is intended to be transported. By the term "vertical" or "vertically", reference is made to the vertical direction. By "vertically extending" is meant extending in the vertical direction. Terms such as upwards, upwardly, upper, over, above, top or "on top" make reference to a vertical direction of the pallet box assembly. Terms such as downwards, downwardly, underneath, lower, below or bottom make reference to a vertical direction towards the ground, when the pallet box assembly is placed thereon.

By vertical/longitudinal plane or by longitudinal/vertical plane is meant a plane stretching in a vertical and a longitudinal direction.

By lateral/longitudinal plane or by longitudinal/lateral plane is meant a plane stretching in a lateral and a longitudinal direction.

By vertical/lateral plane or by lateral/vertical plane is meant a plane stretching in a vertical and a lateral direction.

By bottom surface is meant surface in the bottom of the tub. The bottom surface may also be described as the tub floor.

By "an upwardly arc-shaped portion" is meant a portion of a surface of convex shape in relation to the ground, or a portion of a surface bowed upwards.

Optionally, the tub has a lower plate vertically below the bottom plate and connecting to its side portions.

A benefit of having a lower plate connecting to the side portions is that it reinforces the bottom plate. Partly by countering lateral expansion of the bottom plate due to forces acting on the upwardly arc-shaped portion, such as when receiving and/or transporting heavy objects as already described above. As a consequence, forces emanating from loading the tub of the pallet box assembly are prevented from mitigating to and causing damage to the frame. Further, the lower plate reinforces the bottom plate by providing an additional layer of material between the bottom surface and the lateral rails.

A further benefit is that the lower plate ensures a cushioning or dampening effect from impact loads, primarily towards the lateral rails of the frame when the tub is loaded. As the lower plate counteracts lateral forces caused by impact forces onto the upwardly arc-shaped portion, the upwardly arc-shaped portion is prevented from becoming flat. As such, the upwardly arc-shaped portion can still maintain an upwardly arced shape, thereby providing a cushioning or dampening effect before the impact forces are transmitted to the frame, thereby prolonging the service life of the frame.

Alternatively, or additionally, the tub may have any other object suitable as a tensioning element for restricting lateral expansion of the bottom plate, such as bars or wires connected to the lateral side portions. It does therefore not necessarily need to be a plate as such, but could also be any other object suitable as a tensioning element for restricting lateral expansion of the bottom plate, such as bars or wires connected to the lateral side portions.

Optionally, the lower plate comprises two bent sections and two substantially vertical sections with substantially corresponding profiles to the bent sections and vertical section of the bottom plate. The respective bent sections and the vertical sections being at least partly in abutting contact.

A benefit of having bent sections and vertical sections also on the lower plate with matching profiles to and being in abutting contact with the ones of the bottom plate is that it can further support in preventing the lateral expansion of the tub in a reliable and cost-efficient manner. The bottom plate can simply be placed inside the lower plate where its vertical portions make sure to prevent the lateral expansion of the tub.

Optionally, the lower plate comprises a longitudinally extending connection area for connecting to a second connection area of the vertical section of the bottom plate.

A benefit of having a longitudinally extending connection area for connecting to the vertical section of the bottom plate is that can be applied easily as there is no need to arrange or align the plates to be welded. Further benefits are the same benefits as already described in great detail above for the bottom plate, i.e. to move the connecting areas, often having lower structural integrity, away from the corner portions. This as the corner portions are exposed to much stress due to loads and thermal expansion acting on the bottom plate.

Optionally, the tub comprises a front plate extending substantially in a lateral/vertical-plane and connecting to the side plates in the front end of the tub, thereby forming a front wall of the tub, wherein the tub presents a gap in between the bottom plate and the front plate. The gap may be in the vertical direction or in the longitudinal direction.

A front wall forms a more enclosed tub so that it can more reliably transport material without the material falling off the tub. A benefit of having a gap in between the bottom plate and the front plate forming the front wall is that it allows for thermal expansion of the floor as it carries high temperature objects, such as metal scrap or slag, without causing additional stresses to the tub from the interaction with the front plate.

Optionally, the tub has a front lateral reinforcing beam connected to an external front end of the bottom plate or the lower plate. The front lateral reinforcing beam may have a protrusion extending upwards along an external side of the front plate and configured for coming in abutting contact with the front plate when the front plate bulges forward due to heavy loads, thereby supporting the front plate.

A benefit of having a protrusion extending upwards along an external side of the front plate is that it can help to support the front plate as it is bulging forward due to heavy loads, thereby relieving the connections of the front plate and the side plates, yielding a more durable tub. This is particularly relevant as a gap is present between the lower part of the plate and the bottom portion so that the front plate is not rigidly connected to the floor.

Optionally, the bottom surface and/or the side walls are constructed by a plurality of plates.

A benefit of having the bottom surfaces and/or the side walls constructed by a plurality of plates is that the manufacturing may be easier as the size of the plates may be easier to handle. A further benefit is that that damaged parts may be substituted instead of scrapping the whole tub. Also, a further benefit is that the overall thermal expansion of the tub may be less as the thermal expansion is less between plates compared to one solid plate.

Optionally, the plurality of bottom plates may be placed with a longitudinal and/or vertical overlap of each other. A benefit of this solution is to allow for thermal expansion of the plates without pushing against the abutting plate, but instead sliding on top/underneath in respect to each other.

Optionally, the tub has a plurality of lower plates and presents a gap between each of the plurality of lower plates.

A benefit of having a gap in between the lower plates is that it allows for thermal expansion, thus reducing stresses in the tub. This can be done without losing any capability to retain load of the tub, as would be the case if the side plates or bottom plates presented a gap in between them, as the function of the lower plates are to act as tensioning elements, not to contain material.

Optionally, the tub is placed on the frame without being rigidly attached to the frame.

A benefit of having the tub placed on the frame without being rigidly attached is that it reduces stresses transferred to the frame through its rigid attachments. A further benefit is that the tub can be removed from the frame and replaced easily. The replacement of the tub may for instance be done by simply lifting on and off the tub with a crane, a wheel loader or a forklift, for example.

Optionally, the tub is disconnectably connected to the frame via at least one floating lock mechanism comprising a locking part of the tub, a locking part of the frame and a locking member. The floating lock mechanism provides a gap between at least one of the locking part of the tub, the locking part of the frame and the locking member to allow the tub to thermally expand without pressing against the frame.

A benefit of having a floating lock is that it still connects the tub, ensuring is does not fall off the frame during transport, while still allowing for thermal expansion. Further, the tub is still easy to substitute as the tub is only disconnectably connected, not rigidly connected, to the frame via the locking member.

Optionally, the floating lock mechanism is placed between an upper portion of the tub and the top rails allowing the tub to rest on the points of the floating lock mechanisms, thereby providing a vertical gap between the tub and the frame.

A benefit of having a floating lock in between the top rails and tub is that less heat is transferred to the frame as less surface of the tub and the frame is in abutting contact.

Optionally, the frame further comprises two longitudinally extending brackets extending along an intersection of the lateral rails and the respective connecting rails. The brackets each have a lateral portion supporting the tub, and a vertical portion for restricting lateral movement of the tub.

A benefit of having longitudinally extending brackets onto which the tub is placed, is that it further reinforces the frame and supports the frame to take loads in a better, more evenly distributed way. Compared to when the tub is merely placed on the lateral rails to take up impact loads during loading of the tub, or when the tub thermally expands directly into the connecting rails, the forces are more evenly distributed, and the frame is more protected. This is especially important at sensitive intersections between rails of the frame, where the brackets are placed and connects to the frame. A further benefit is that the brackets may be easily replaced when worn, instead of changing the whole frame, increasing the overall service life of the frame.

Optionally, the pallet box assembly presents a lateral gap in between the tub and the vertical portions of the brackets. Optionally, the lateral gap is at least 0.5% of the lateral extension of the tub at a region of the bracket when the tub is unloaded.

A benefit of having a lateral gap in between the tub and the vertical portions of the brackets is to allow for thermal expansion of the tub without transferring stresses to the frame.

By "region" is meant the part of the tub corresponding to the vertical extension of the bracket.

According to a second aspect of the present disclosure, a carrier system comprising a carrier and a pallet box assembly of a kind as described above is presented to achieve the above-mentioned objective.

According to a third aspect of the present disclosure, use of a pallet box assembly of a kind as described above is presented to achieve the above-mentioned objective.

BRIEF DESCRIPTION OF THE DRAWINGS

With reference to the appended drawings, below follows a more detailed description of embodiments of the disclosure cited as examples.

FIG. 12 is a side elevated sectional view of a tub of a pallet box assembly, according to the present disclosure.

Figure 1A:
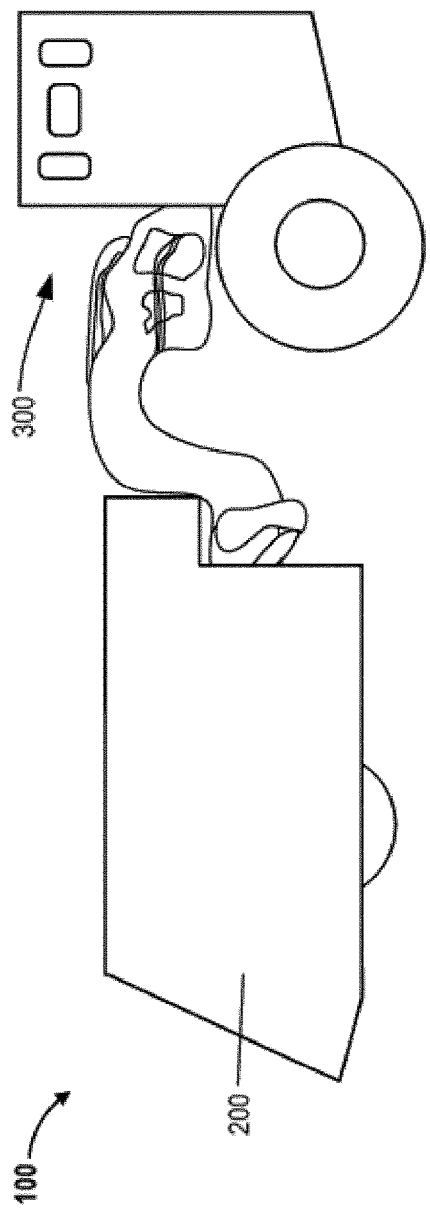
FIGS. 1a and 1b are schematic diagrams illustrating a carrier system including a carrier and a pallet box assembly, according to the present disclosure.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters refer to like elements throughout the description, unless expressed otherwise.

DETAILED DESCRIPTION

Below follows a detailed description of the disclosure with reference to the appended drawings.

Figure 1B:
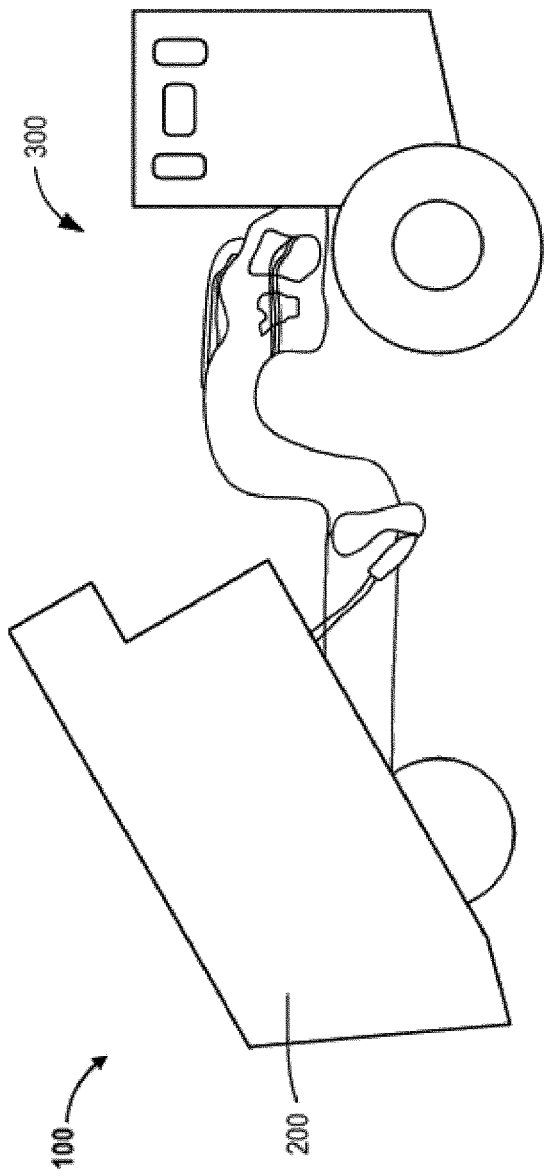

FIGS. 1a and 1b discloses schematic diagrams illustrating an example carrier system 100 that includes a carrier/vehicle 300 and a pallet box assembly 200 coupled thereto. The vehicle 300 (e.g., a truck, lorry, or other carrier) may include a chassis or the like to which the pallet box assembly 200 is removably coupled. As shown in FIG. 1b, actuators, such as hydraulic arms, may be mounted to the vehicle 300 and may operably extend to lift one end of the pallet box assembly 200 to in turn unload the materials loaded therein. A pallet box assembly 200 as for instance shown in following FIG. 2 may be attached to a carrier 300 in a similar manner and may be manipulated in a similar way as is shown in FIGS. 1a and 1b for loading and/or unloading of materials.

Figure 2:
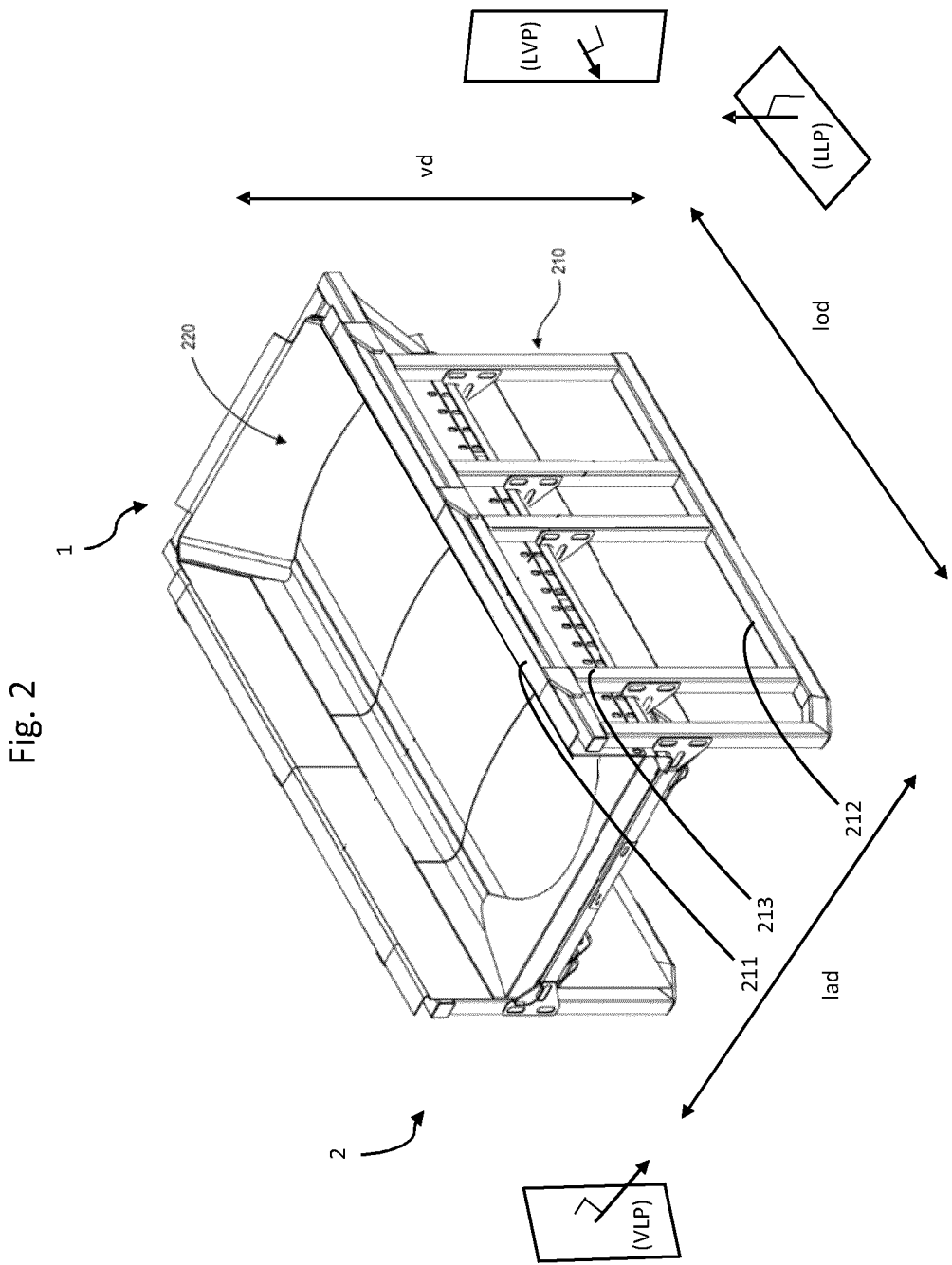
FIG. 2 is a rear perspective view of a pallet box assembly including a frame and a tub, according to the present disclosure.

FIG. 2 discloses an example of a pallet box assembly 200 according to the present disclosure. The pallet box assembly 200 presents a frame 210 and a tub 220 placed within the frame 210. The pallet box assembly 200 has a front end 1 and a rear end 2 separated in a longitudinal direction lod. By longitudinal direction lod is meant a direction in which the pallet box assembly 200 is intended to be transported. By "front" is meant the side towards the direction of transportation during normal operation, such as when being transported on a road covering larger distances. This while keeping in mind that carriers 300 usually are able to transport in an opposite direction as well when needed, as when a vehicle is backing up towards and object, such as a pallet box assembly 200, to connect it for further transport. This is though not considered as normal operation as when the object is transported on a road, covering larger distances compared to when backing up towards an object. The opposite end, here called "rear" is the opposite to the front end 1, thus being in the back of an object with reference to the direction of transportation. Here, the rear end 2 is associated with unloading material that has been loaded into the tub 220 and optionally transported to the carrier system's 100 (shown in FIG. 1a, 1b) intended point of delivery of the material. The front end 1 is the end adapted to receive the carrier 300. The carrier 300 may back its rear end to make contact with the front end 1 of the pallet box assembly 200, after which the pallet box assembly 200 is lifted by the carrier 300 to be transported in the longitudinal direction lod.

Further, a lateral direction lad is shown. The lateral direction lad is shown as a direction perpendicular to the longitudinal direction lod and substantially in level with the extension of the ground (not shown) on which the pallet box assembly 200 is intended to stand or be transported above. The pallet box assembly 200 comprises (better shown in FIG. 3) longitudinally extending rails 211, 212 having connecting rails 213 extending in between them. The connecting rails 213 have longitudinal rails carrying the tub 220 in one end, and the rail 212 at the other end of the connecting rails 213 is intended to be placed towards the ground.

Further, a vertical direction vd is shown substantially perpendicular to a plane defined by the longitudinal direction lod and the lateral direction lad. Thus, the vertical direction vd is substantially perpendicular to a plane defined by the ground, the ground being for instance a road on which the pallet box assembly 200 is intended to be transported. Terms such as upwards, upwardly, upper, over, above, top or "on top" make reference to a vertical direction vd away from the ground (not shown), when the pallet box assembly 200 is placed thereon.

Further, a vertical/longitudinal plane (VLP) stretching in a vertical and a longitudinal direction lod is shown.

Further, a lateral/longitudinal plane (LLP) stretching in a lateral- and a longitudinal direction lod is shown.

Further, a lateral/vertical plane (LVP) stretching in a vertical- and a lateral direction lad is shown.

Figure 3:
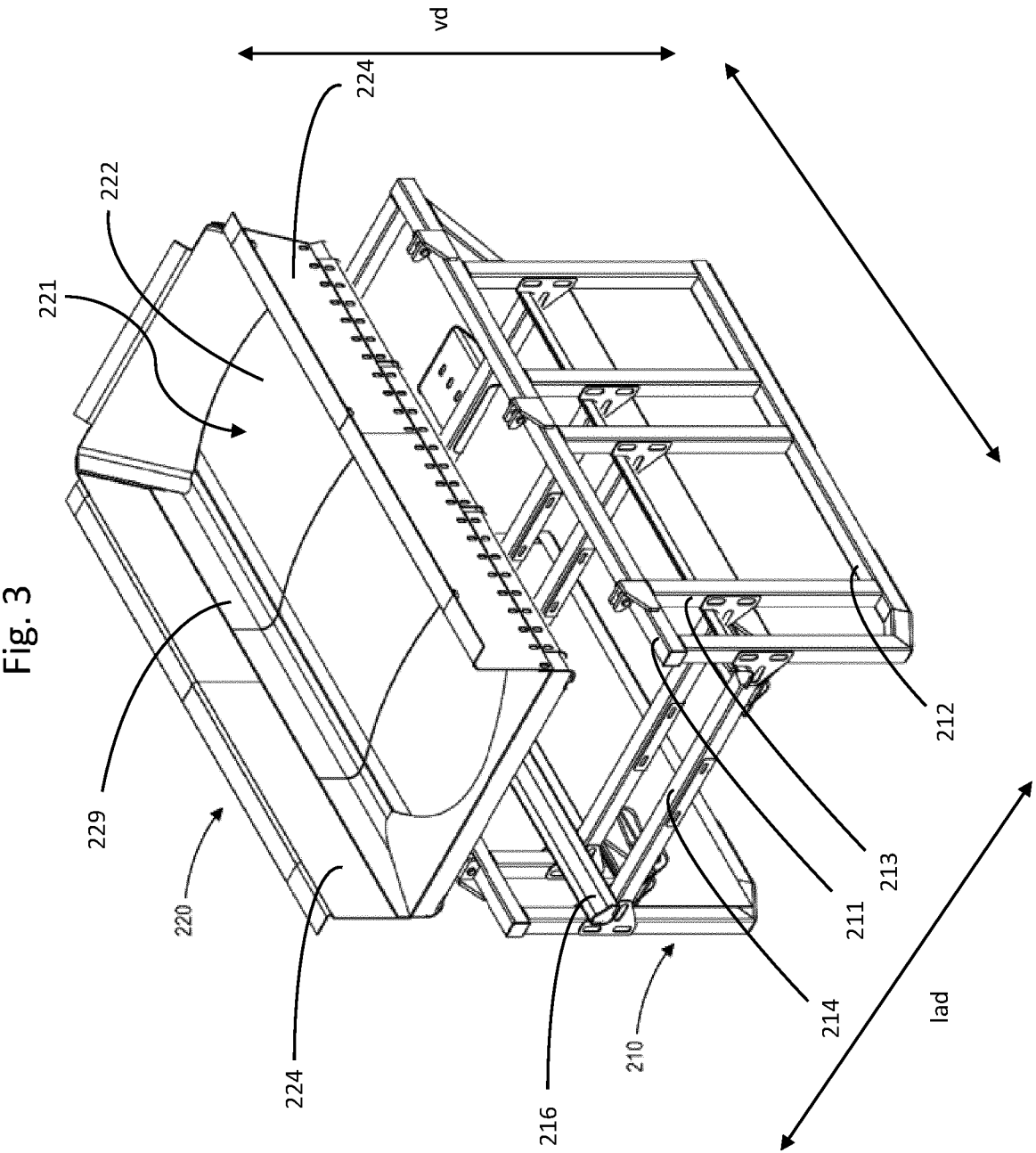
FIG. 3 is a rear perspective view of the pallet box assembly according to FIG. 2 with the tub positioned over and above the frame.

FIG. 3 discloses a perspective view of the pallet box assembly 200 according to FIG. 2, here with the tub 220 positioned over and above the frame 210, thereby showing some of the components of the pallet box assembly 200 more clearly. As may be gleaned from the figure, top rails 211 and bottom rails 212 can be seen extending a longitudinal direction lod, having connecting rails 213 extending in a substantially vertical direction vd and connecting a top rail 211 with a bottom rail 212, thereby forming two side portions of the frame 210. Lateral rails 214 are extending in in a lateral direction lad connecting to the connecting rails 213 of each frame side, thereby forming the frame 210. The lateral rails 214 may be connected at height enough for a carrier 300 to be able to at least partly be placed underneath to connect to for future transport. Further, optional longitudinally extending brackets 216 can be gleaned placed on top of the lateral rail 214 by the intersection of the connecting rails 213.

The frame 210 may include rails 211-214 that substantially forms a stiff skeleton for the pallet box assembly 200. The rails 211-214 may be formed from high-strength structural steel, e.g., with a minimum yield strength of 650 MPa, and with thickness ranging between 4 and 160 mm, such as Strenx® by SSAB, although other steels or metals may be used with different yield strengths and thicknesses.

Figure 6:
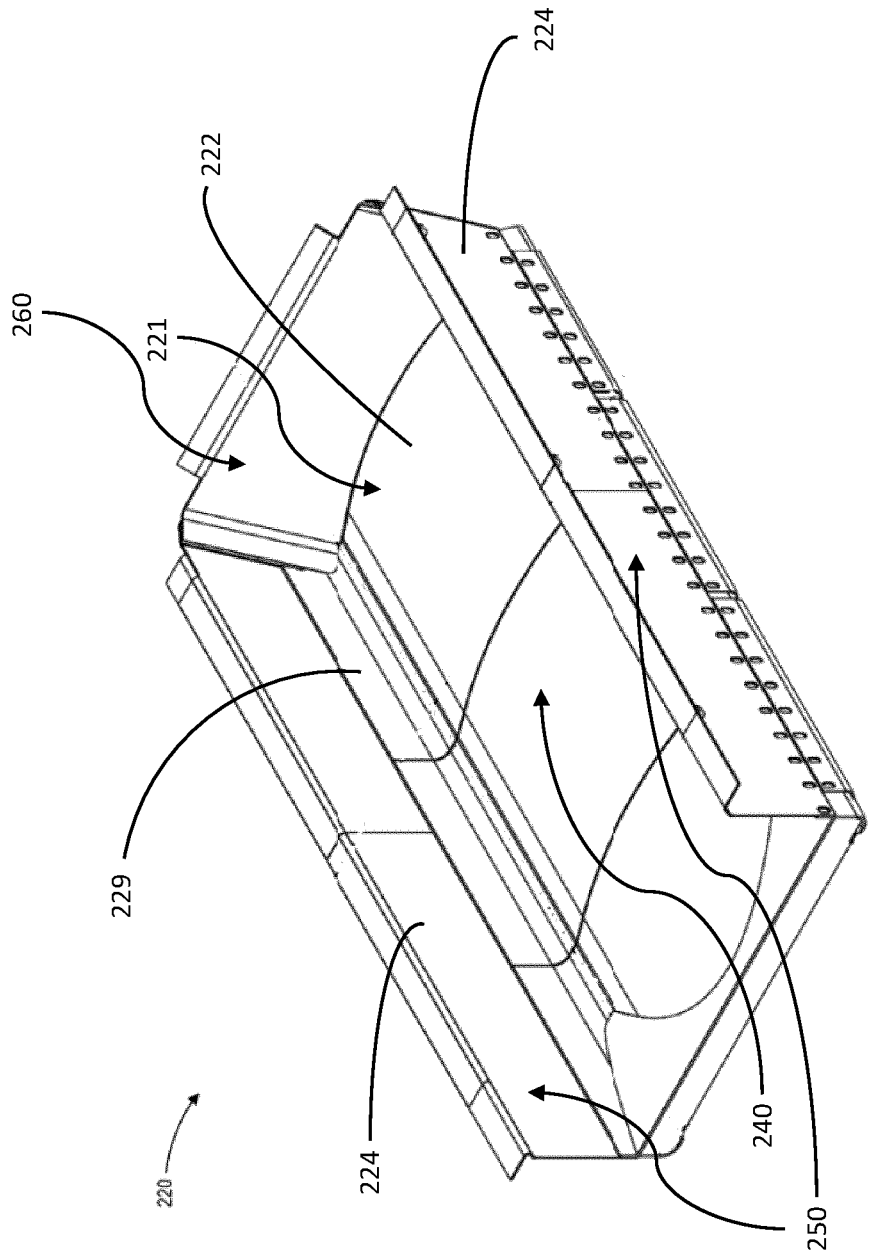
FIG. 6 is a rear perspective view of a tub of a pallet box assembly, according to the present disclosure.

As may be further gleaned, the tub 220 is shown having side plates 224 comprising at least part of side walls 250 of the tub 220, see e.g. FIG. 6. The tub 220 presents a bottom plate 221 extending in a plane between and connecting to the side plates 224 at a vertical section 229 of the bottom plate 221. The bottom plate 221 further presents an upwardly arc-shaped portion 222. This is further explained in FIG. 7.

Figure 4:
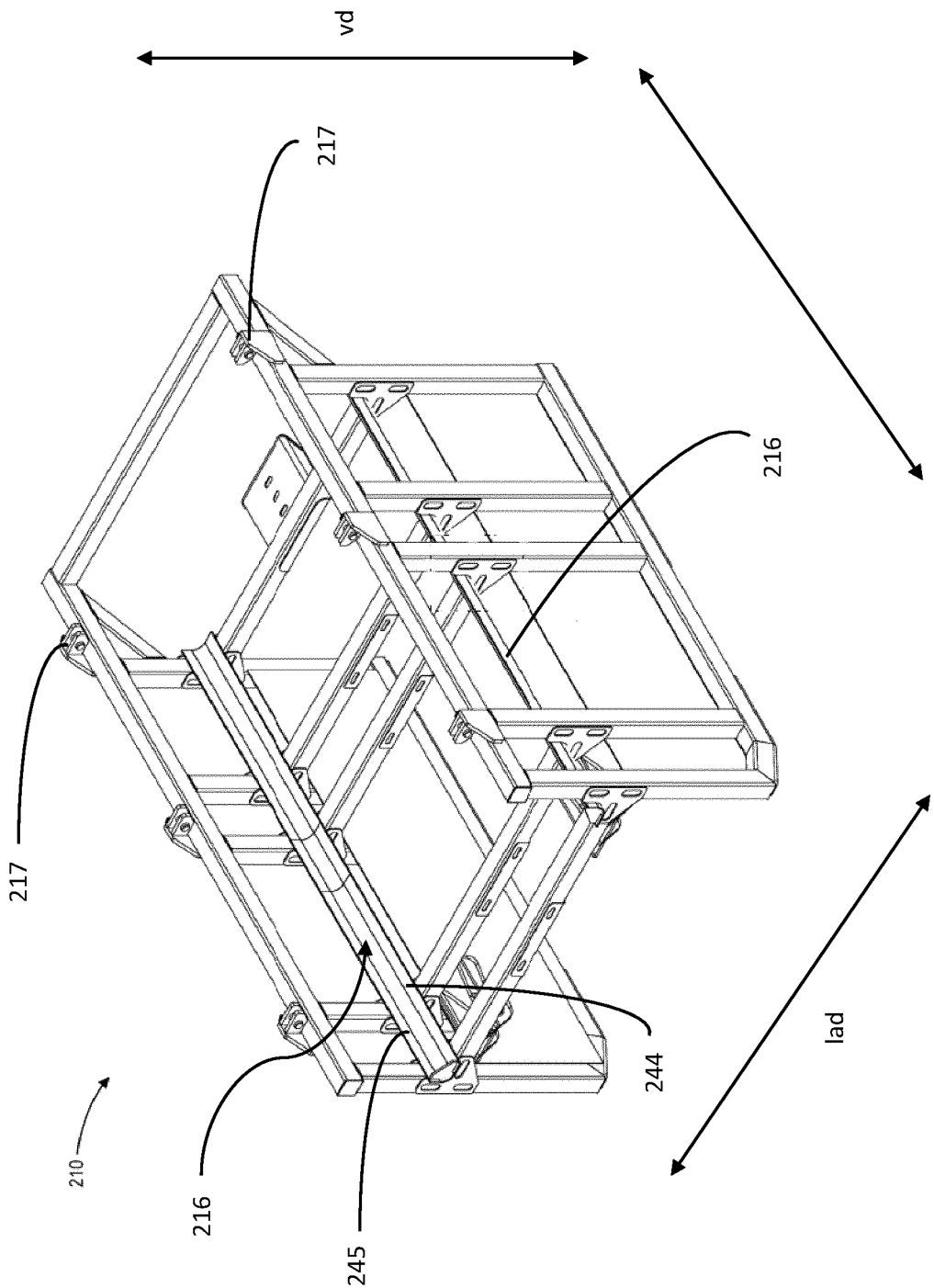
FIG. 4 is a rear perspective view of a frame of a pallet box assembly, according to the present disclosure.

FIG. 4 discloses a perspective view of the frame 210 of the pallet box assembly 200 as explained in FIG. 3, here shown without the tub 220. FIG. 4 shows the optional longitudinally extending brackets 216 from FIG. 3 seen in greater detail, comprising a lateral portion 244 and a vertical portion 245. The lateral portion 244 may be used for placing the tub 220, and the vertical portion 245 may be used for controlling the tub 220 in lateral direction lad.

Further, FIG. 4 shows optional floating lock mechanisms 217 (shown in greater detail in FIG. 10) connected to the frame 210. The floating lock mechanisms 217 may be used to disconnectably connect the tub 220. The optional floating lock mechanisms 217 are shown extending in vertical direction vd from the top rails 211. In an embodiment of the disclosure, the tub 220 is placed on top of the floating lock mechanisms 217, thereby providing a gap 226 to the frame 210.

Figure 5:
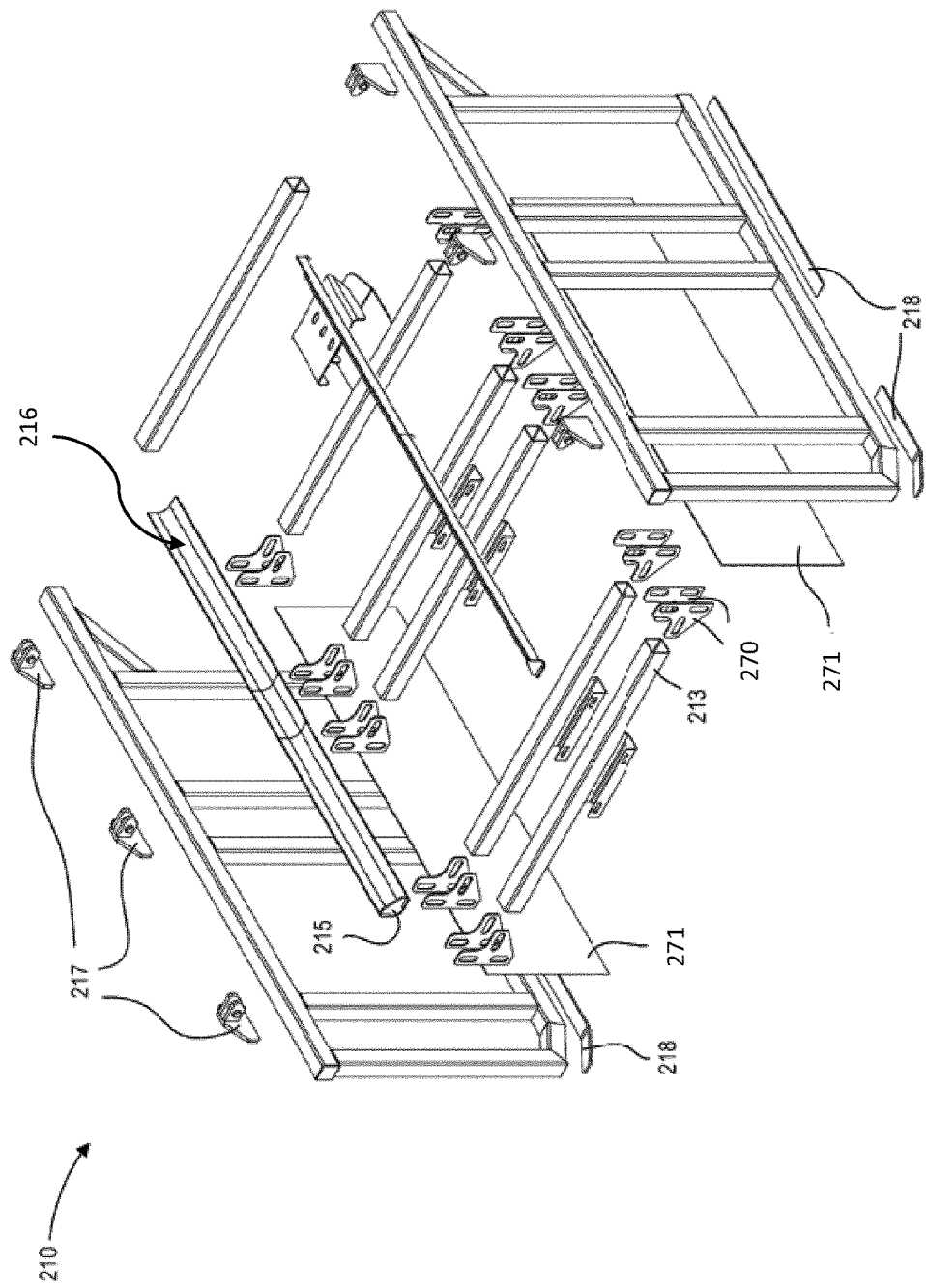
FIG. 5 is an exploded rear perspective view of a frame of a pallet box assembly, according to the present disclosure.

FIG. 5 discloses an exploded perspective view of the frame 210 of the pallet box assembly 200 as displayed in FIG. 4. Here, further optional details of the frame 210 are shown. As may be gleaned, optional lower side plates 214 are shown vertically below the brackets 216. The lower side plates 214 may be placed there to protect tires of the carrier 300. This may be particularly important when loading hot metal slag into the tub 220 that may otherwise damage the tires. Further, optional stoppers 215 are shown at a rear end of the brackets 216. The stoppers 215 may be used as an optional feature to secure the tub 220 at the frame 210, ensuring the tub 220 does not slide off the frame 210. The stoppers 215 may be especially relevant if the optional floating lock mechanisms 217 are not used to disconnectably connect the tub 220 to the frame 210.

Further, optional skid plates 218 are shown underneath the bottom rails 212. The optional skid plates 218 may be coupled to the underside of the bottom rails 212 of the frame 210. The skid plates 218 may be constructed from liner plates or other wear parts, and/or any other suitable material designed to reduce wear or otherwise serve as sacrificial components. The skid plates 218 may be comprised by materials with a substantial amount of carbides, such as chromium carbides, borocarbides etc.

Further, optional gusset plates 270 are shown. The gusset plates 270 may be rigidly attached to the frame 210 to reinforce the connection of the lateral rails 214 to the connecting rails 213.

FIG. 6 discloses a perspective view of a tub 220 of the pallet box assembly 200, according to an example of the present disclosure. FIG. 6 shows side plates 224 and bottom plates 221 forming two side walls 250 and a bottom surface 240. Further, an optional front wall is shown.

Figure 7:
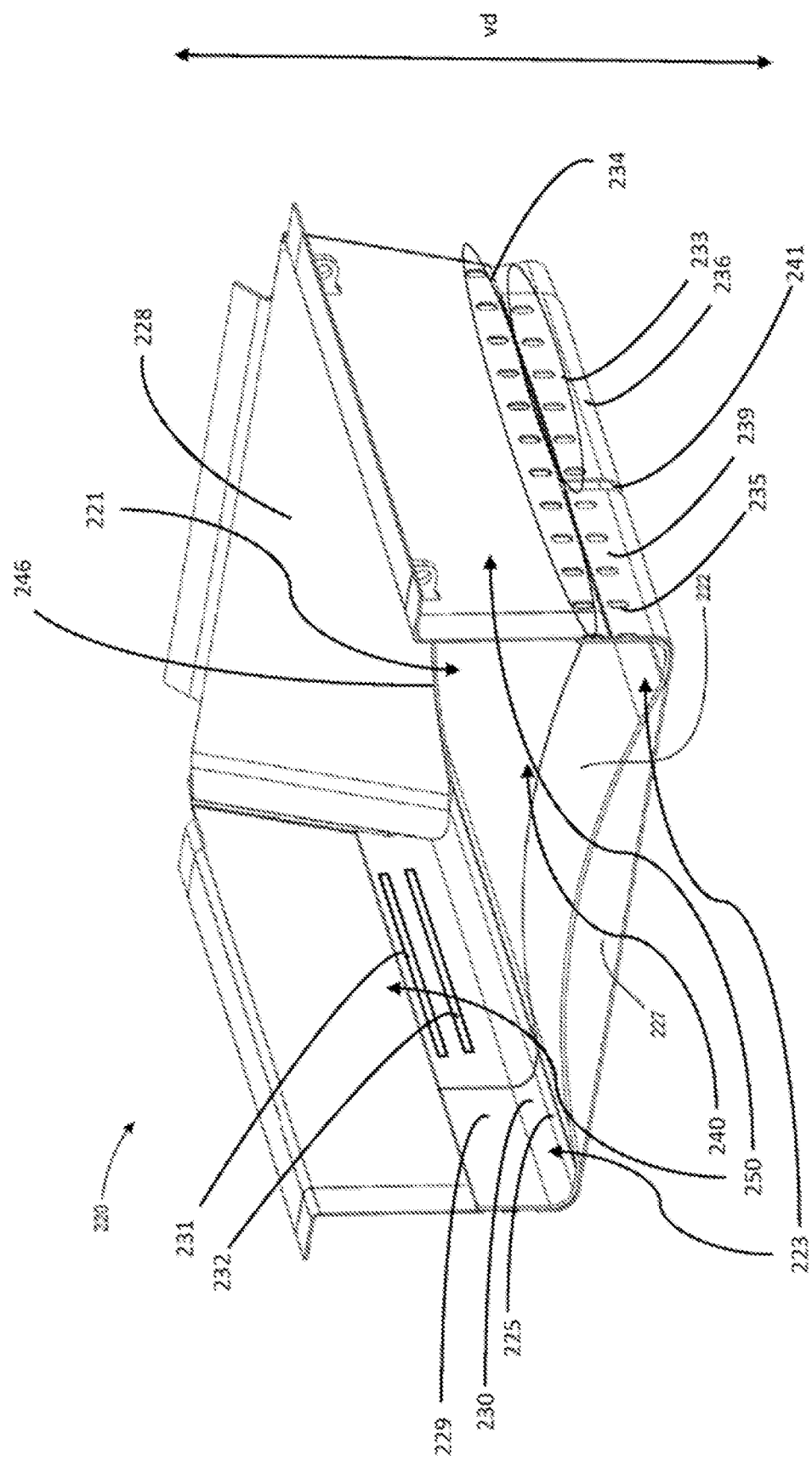
FIG. 7 is a rear perspective sectional view of a tub of a pallet box assembly illustrating a convex bottom surface, according to the present disclosure.

FIG. 7 discloses a front perspective sectional view of the tub 220 as presented in FIG. 6, thereby showing features of the tub 220 in greater detail. As such FIG. 6 shows the bottom plate 221 structure according to an example of the present disclosure. The bottom plate 221 has an upwardly arc-shaped portion 222 in between two lateral side portions 223. Each of the side portions 223 has a substantially lateral section 225 connecting to the upwardly arc-shaped portion 222, a substantially vertical section 229, and a bent section 230 in between the substantially lateral and vertical section, 225 and 229. The lateral section 225 may be adapted to support the tub 220 against the lateral rails 214 of the frame 210. The bent sections 230 form longitudinally extending corner portions of the tub 220. The substantially vertical sections 229 reach upwards from the bent sections 230 to align and connect to the respective side plate 224. The substantially vertical section 229 and the respective side plates 224 further shows a longitudinally extending connection area 231, 234.

Here, the connection area 234 of the side plate 224 aligns vertically with the first connection area 231 of the bottom plate 221. The connection area 234 of the side plate 224 show apertures 235 that may be used for plug welding the side plate 224 to the vertically corresponding first connection area 231 of the bottom plate 221. In an embodiment, the apertures 235 that may be used for plug welding are presented at the first connection area 231 of the bottom plate 221 instead. In another embodiment of the disclosure, both the side plate 224 as well as the bottom plate 221 comprises apertures for connecting the plates using mechanical fasteners, such as bolts and nuts (not shown). The connection areas 231, 234 may be joined using any other method suitable for connecting the side plate 224 and the bottom plate 221. In an embodiment of the disclosure, a longitudinally extending welded seam is used to connect the plates 221, 224.

Further, FIG. 7 shows the longitudinally extending connection areas 231, 234 for connecting the plates aligned in a vertical direction vd, with the side plate 224 being on a lateral outside of the bottom plate 221. In an embodiment, the side plate 224 is connected on a lateral inside of the bottom plate 221. By "inside" or "internal side" is meant on a side facing towards an envisioned load of the tub 220. By "outside" or "external side" is meant the opposite to the inside or internal side, i.e. a side facing away from an envisaged load of the tub 220.

In an embodiment, the bent section 230 and the vertical section 229 of the bottom floor plate may extend vertically to at least 10×, preferably at least 15× the thickness of the bottom plate 221 to accommodate for vertically aligned connection areas 231, 234 with the side plates 224.

In embodiment of the disclosure, the longitudinally extending connection areas 231, 234 of the bottom plate 221 and the side plates 224 are aligned laterally. In this embodiment, the plates may have apertures that can be aligned using vertically extending connection plates on one or both sides of the plates that may be connected with mechanical elements going through the apertures, such as bolts and nuts or rivets. In another optional embodiment of the disclosure, the longitudinally extending connection areas 231, 234 of the bottom plate 221 and the side plates 224 are aligned laterally and connected by a longitudinally extending welded seam.

Further shown in FIG. 7, an upwardly arch-shaped portion 222 is shown. Having a curvature of the bottom surface 240 may reduce the stresses caused by thermal expansion of the tub 220 on frame 210. This as the thermal expansion may be done vertically to some degree, which might otherwise push laterally on the frame 210. In addition, an upwardly arc-shaped portion 222 of the bottom surface 240 may better disperse impact forces caused by materials being dropped into the tub 220 compared to other pallet box designs having flat or non-curved bottom surface 240. When the impact forces are dispersed, the forces travel down and to the lateral side portions 223 of the bottom plates 221 and into the corner portions of the tub 220 where they are taken up by other structural elements of the tub 220, such as the side walls 250 and an optional front wall as also shown in FIG. 7.

As such, the corner portions may be exposed to even more impact forces and stress when comprising an upwardly arc shaped portion. As may be gleaned in FIG. 7, the corner portions 230 of the tub 220 are made in one solid material just as the plate. As such, the exposed corner portions are not weakened by any connection areas 231, 234 comprising holes or welds, that would otherwise compromise the structural integrity of the corner portions. Instead, the connection areas 231, 234 may be placed on vertical sections 229 facing away from the corner portions, as shown. The sidewalls 250 of the tub 220 may experience lesser amounts of thermal expansion compared to the bottom surface 240 carrying high-temperature objects. Therefore, the side walls 250 are better suited to serve as location for connecting the two plates.

Further shown in FIG. 7 is an optional lower plate 227 placed below the bottom plate 221 and connecting to its side portions. The lower plate 227 may support and reinforce the bottom plate 221 by providing an additional layer of material between the bottom surface 240 and the lateral rails 214. Further, by connecting a lower plate 227 to the side portions 223, the bottom plate 221 may be reinforced in terms of countering lateral expansion of the bottom plate 221 due to forces acting on the upwardly arc-shaped portion 222, such as when receiving heavy objects dropped on the upwardly arc-shaped portion 222. As a consequence, forces emanating from loading the tub 220 of the pallet box assembly 200 are prevented from mitigating and causing damage to the frame 210. Further, thermal expansion of the bottom plate 221 is also prevented in lateral extension, causing the upwardly arc-shaped portion 222 to extend vertically instead of laterally, reducing the risk of causing damage to the frame 210.

The bottom plate 221 is shown as a plate structure, but it could alternatively be any other object suitable as a tensioning element for restricting lateral expansion of the bottom surface 240. In an embodiment, a rod or bar is used instead or additionally. In a further embodiment, a wire may be used instead or additionally.

As may be further gleaned from FIG. 7, the lower plate 227 may comprise optional bent sections 236 and substantially vertical sections 239 with substantially corresponding profiles to the bent sections 230 and vertical section 229 of the bottom plate 221. This may further support in preventing the lateral expansion of the tub 220 in a reliable and cost-efficient manner as the bottom plate 221 may simply be placed inside the lower plate 227 without connecting anything to the lateral side portions 223, as may be the case connecting a plate, wire or rod between the respective lateral sections 225. The vertical section 239 may reliably ensure prevention of the lateral expansion of the tub 220, as the vertical sections 239 serve as a physical obstacle to the bottom plate 221 standing in its way to expand. Compared to having lower plates 227 or other tensioning elements, such as rod wires, connected to the lateral sections 225 acting by pulling back the extension, this may be a more reliable solution as it does not comprise any connecting areas that may break before the lower plate 227 can take up the lateral extension of the bottom plate 221.

As further shown in FIG. 7, the lower plate 227 may comprise a longitudinally extending connection area 233 for connecting to a second connection area 232 of the vertical section 229 of the bottom plate 221. This way the tub 220 including the lower plates 227 may be, in some applications, more conveniently handled as one integrated item. Further, as already described in detail above for the bottom plate 221, this may be done while ensuring to have the connecting areas 232, often having lower structural integrity, away from the corner portions 230 that may be exposed to much stress and loads.

In an embodiment of the disclosure, the lower plate 227 is rigidly connected to the frame 210 of the pallet box assembly 200, into which the tub 220 can simply be placed and exchanged when worn. The connection area 233 is shown as apertures for plug welding, but it may also have any combination of connection methods as already mentioned for connecting the bottom and the side plate 224, such as using mechanical fasteners or using a longitudinally extending welded seam.

In an embodiment, the bent section 230 and the vertical section 229 of the bottom plate 221 extends vertically to at least 15×, preferably 20× the thickness of the bottom plate 221 to accommodate connection areas 231, 232 for both the lower plate 227 as well as the side plates 224.

As may be further gleaned from FIG. 7, the tub 220 may optionally have plurality of lower plates 227. Further, an optional gap 241 may be present between each of the plurality of lower plates 227. This may allow for thermal expansion between the lower plates 227, causing less stresses to the pallet box assembly 200.

As may be further gleaned, an optional front plate 228 extending substantially in a lateral/vertical-plane and connecting to the side plates 224 in the front end 1 of the tub 220, thereby forming a front wall of the tub 220. Further, a gap 246 may be gleaned in between the bottom plate 221 and the front plate 228. The gap 246 may allow for thermal expansion between of the bottom plates 221, causing less stresses to the pallet box assembly 200. The gap 246 may be in the vertical direction vd and/or in the longitudinal direction lod.

Figure 8:
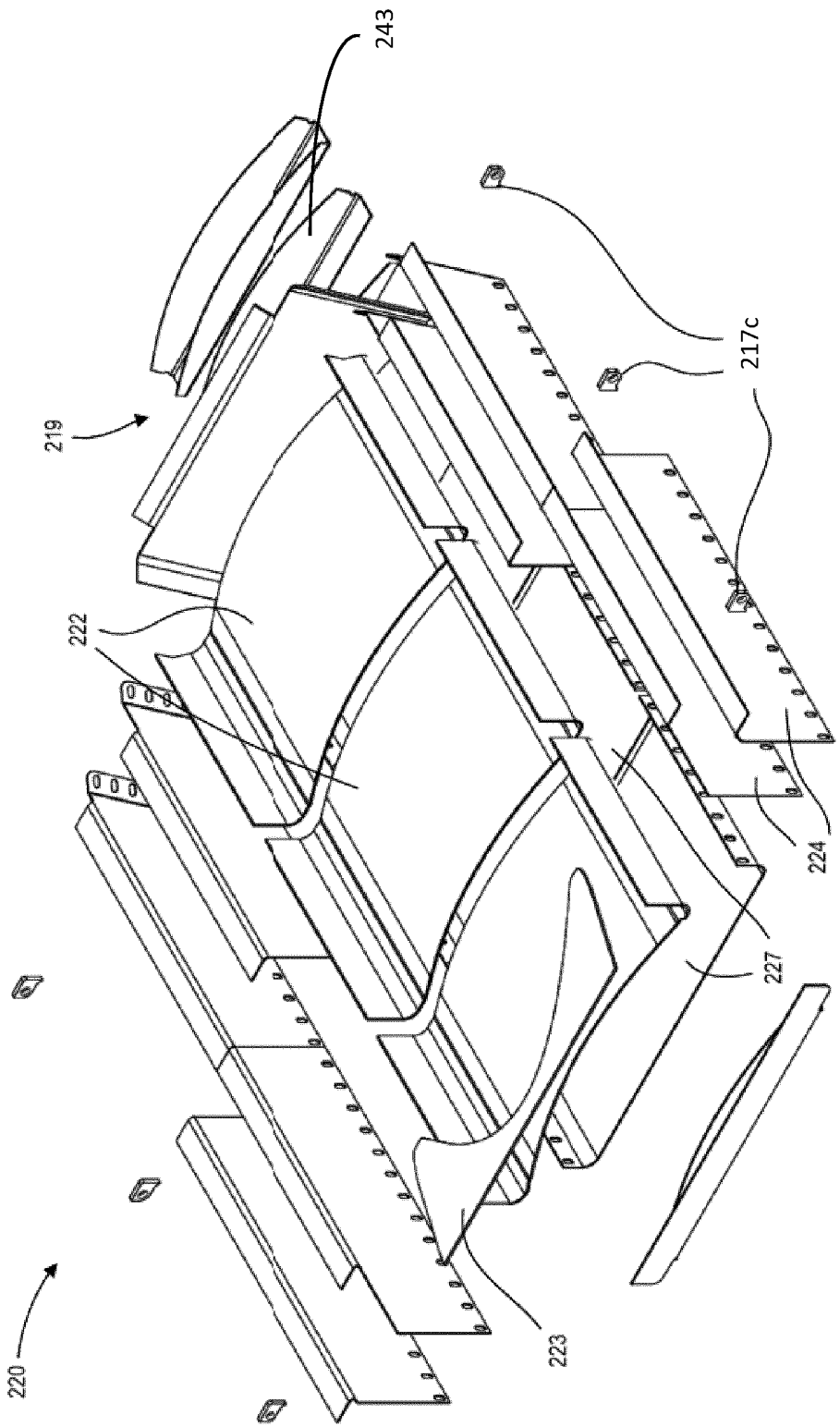
FIG. 8 is an exploded rear perspective view of a tub of a pallet box assembly, according to the present disclosure.

FIG. 8 discloses an exploded front perspective view of the tub 220 in FIG. 6 of the pallet box assembly 200. Here it may be gleaned that the tub 220 may optionally be constructed by a plurality of plates. This may make the manufacturing process easier, as the tub 220 may be divided to smaller elements easier to handle. Further, a damaged part may be substituted instead of scrapping the whole tub 220. In an embodiment, the tub 220 comprises a plurality of plates comprising using mechanical fasteners as connections, such as bolts and nuts. This may ensure easy substitution of damaged plates.

In an embodiment, the plurality of bottom plates 221 may be placed with a longitudinal and vertical overlap of each other. This way the tub 220 may be sealed, without comprising a lateral weld to join the bottom plates 221 together. In an embodiment, the rear bottom plates 221 vertically overlap underneath to the adjacent front bottom plate 221. This enables load to slide off in the rear of the tub 220 without encountering vertically extending walls in the direction to which the load slides. Instead, the load slides "down" a vertical step by the overlap.

Figure 9:
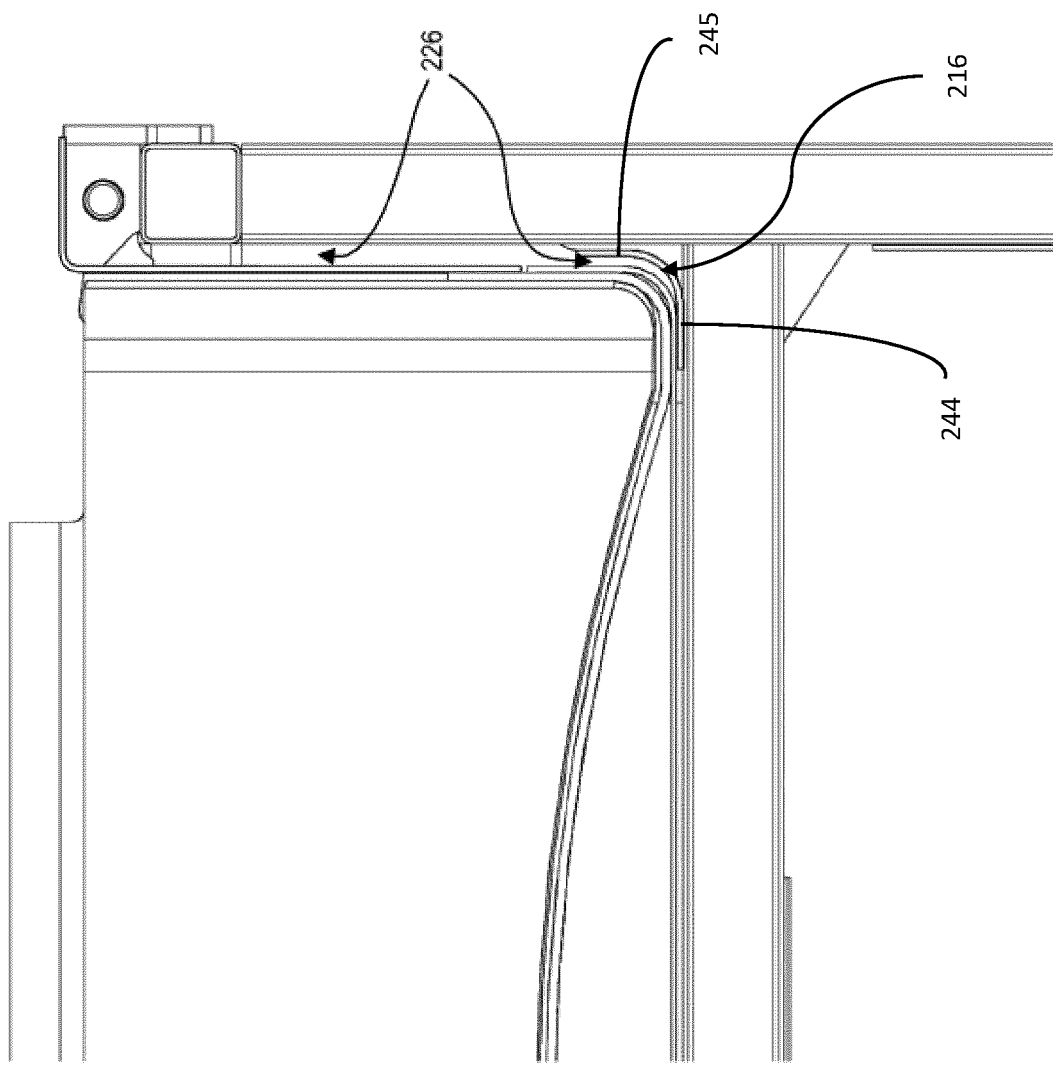
FIG. 9 is a detailed rear elevated sectional view showing a gap between the tub and the frame of the pallet box assembly, according to the present disclosure.

FIG. 9 discloses a detailed elevated sectional view showing a lateral gap 226 between the tub 220 and the frame 210 of the pallet box assembly 200, according to the present disclosure. This may allow the tub 220 to expand due to load or thermal expansion without affecting the frame 210. In an embodiment, the total lateral gap 226 between both the vertical portions 245 of the two brackets 216 is at least 0.5% of the lateral extension of the tub 220 at a region of the bracket 216 when the tub 220 is unloaded. This may allow the tub 220 to expand without transferring stresses to the frame 210. By "region" is meant the part of the tub 220 corresponding to the vertical extension of the brackets 216.

Figure 10:
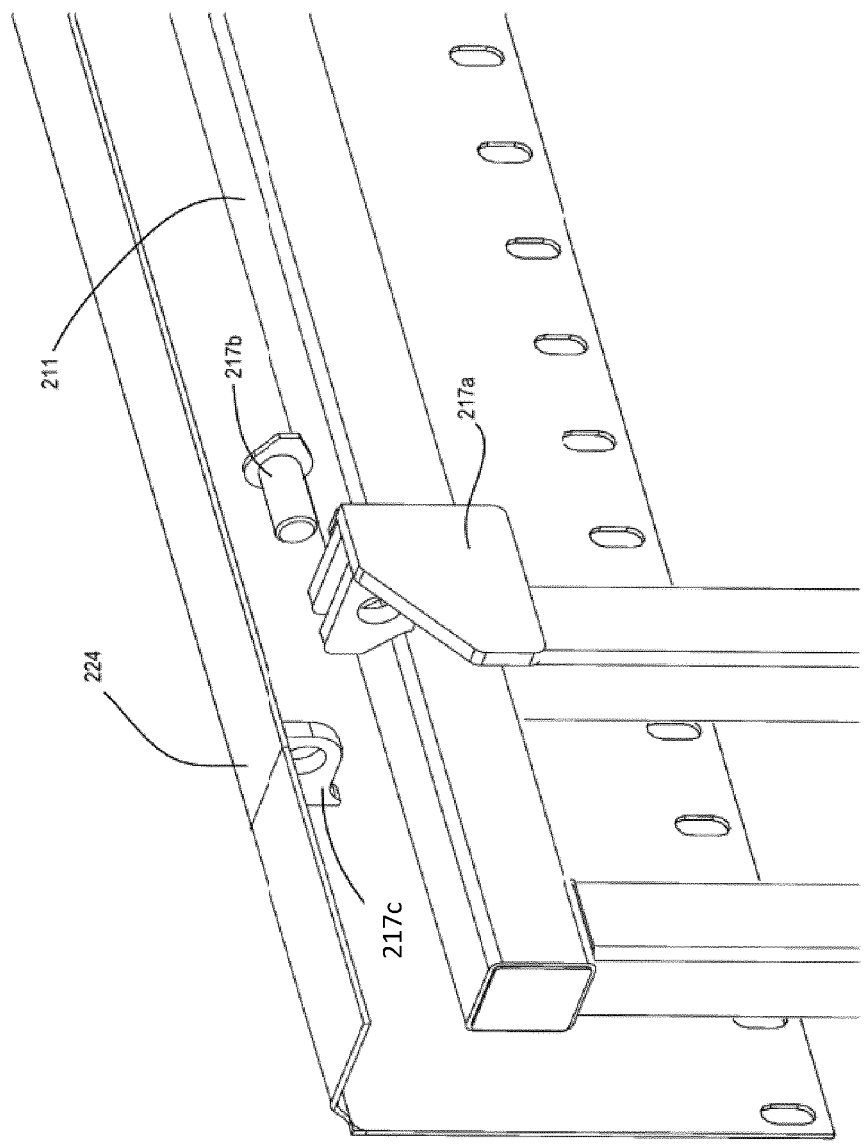
FIG. 10 is a detailed rear perspective view of a floating lock used to disconnectably connect the tub to the frame, according to the present disclosure.

FIG. 10 discloses a detailed perspective view of the floating lock mechanism 217 as previously mentioned in FIG. 4, here presented in greater detail. As may be gleaned, an optional floating lock mechanism 217 is shown, comprising a locking part of the tub 217c, a locking part of the frame 217a and a locking member 217b to lock the respective locking parts together. As may be gleaned, the locking member 217b may be in the shape of a pin to be put through apertures of the locking parts 217a, 217c, thereby interlocking them.

In an embodiment, the tub 220 is disconnectably connected to the frame 210 via at least one floating lock mechanism 217. The floating lock mechanism 217 provides a gap between at least one of the locking part 217c of the tub 220, the locking part 217a of the frame 210 and the locking member 217b to allow the tub 220 to thermally expand without pressing against the frame 210 via the floating lock mechanism 217.

In an embodiment, the side plates 224 may have laterally extending portions at the top of the side plates 224, intended to be placed on respective top rails 211 to provide support for the tub 220.

As may be gleaned in FIG. 10, the floating lock mechanism 217 may be placed between an upper portion of the tub 220 and the top rails 211 allowing the tub 220 to rest on the points of the floating lock mechanisms 217, thereby providing a vertical gap between the tub 220 and the frame 210. This provides a vertical gap between the frame 210 and the tub 220 that may lower the amount of heat transmitted from the tub 220 to the frame 210 compared to when the tub 220 is in abutting contact with the top side portion of the top rail 211.

Figure 11:
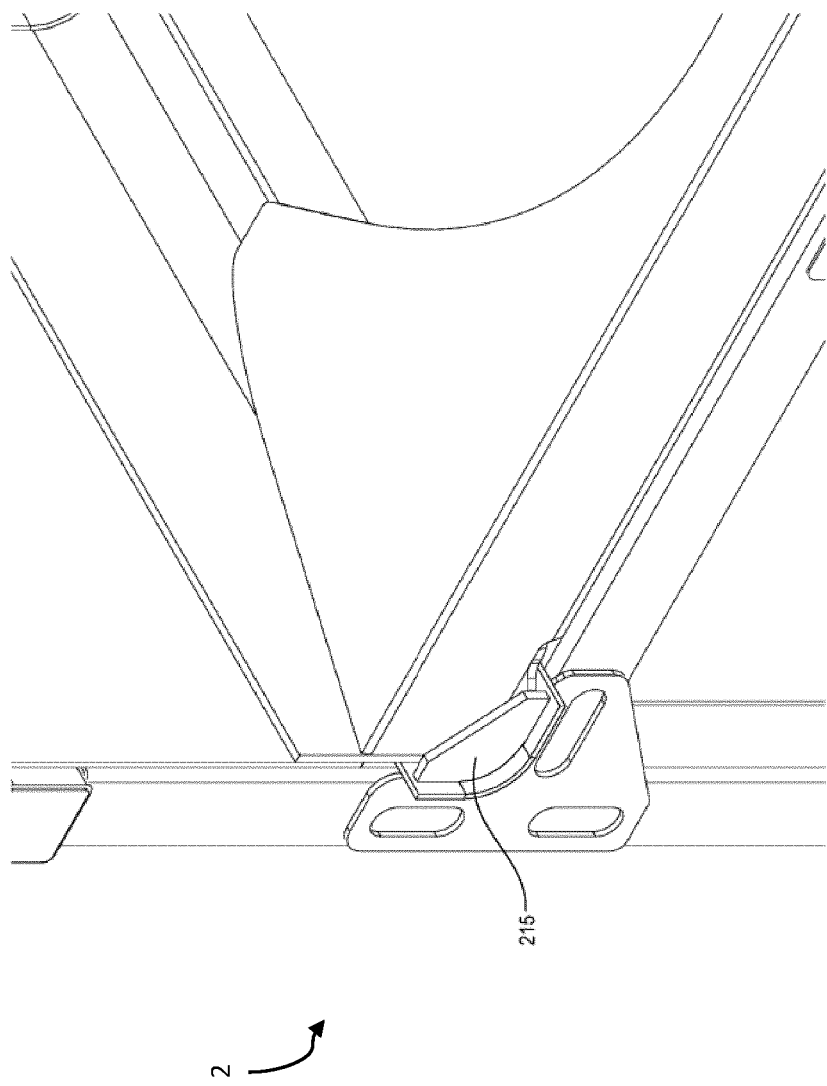
FIG. 11 is a detailed rear perspective view showing a stopper that restricts longitudinal movement of the tub relative to the frame, according to the present disclosure.

FIG. 11 discloses a detailed perspective view showing the stopper 215 that may restrict longitudinal movement of the tub 220 relative to the frame 210, according to the present disclosure.

In an embodiment of the disclosure, the pallet box assembly 200 comprises a tub 220 placed in the frame 210 without being disconnectably connected, further comprising stoppers 215 connected to the frame 210. As may be gleaned from FIG. 11, the stoppers 215 may be placed by a rear end 2 of the tub 220.

FIG. 12 discloses a side sectional view of the tub 220 of the pallet box assembly 200, according to an example of the present disclosure. As may be gleaned, the tub 220 shows a front lateral reinforcement beam 242 and a protrusion 243 extending upwards along a side of a front plate 228. The protrusion 243 may be used to reinforce the front plate 228 as it may be bulging forward due to heavy loads, relieving the front plates 228 connections to the side plates 224.

It is to be understood that the present invention is not limited to the embodiments described above and illustrated in the drawings; rather, the skilled person will recognize that many changes and modifications may be made within the scope of the appended claims.

The invention claimed is:

1. A pallet box assembly for receiving and transporting heavy and/or high temperature objects, the pallet box assembly having a front end and a rear end separated in a longitudinal direction (lod), the front end being adapted to receive a carrier for transporting the pallet box assembly, the pallet box assembly comprising a tub and a frame configured for receiving the tub, the frame comprising:
at least two top rails separated in a lateral direction (lad) and extending longitudinally, and
at least two bottom rails separated in the lateral direction (lad) and extending longitudinally,
connecting rails connecting a respective top rail and a bottom rail, and
lateral rails extending laterally and connecting the respective connecting rails,
the tub comprising:
at least two laterally separated side plates, the side plates extending substantially in a respective vertical/longitudinal plane (VLP), thereby forming side walls of the tub;
a bottom plate extending in a lateral/longitudinal plane (LLP) and connecting to a bottom portion of the respective side plates, thereby forming a bottom surface of the tub;
the bottom plate comprising two lateral side portions and at least one upwardly arc-shaped portion therebetween,
the two side portions each comprising a lateral section connecting to the upwardly arc-shaped portion, the lateral section adapted to support the tub against the lateral rails of the frame,
characterized in that
each of the two side portions further comprising:
a bent section connecting to the lateral section, the bent section forming a longitudinally extending corner portion of the tub, and
a substantially vertical section connecting to the bent section, the substantially vertical section reaching upwards from the bent section to align and connect to the respective side plate, wherein
the substantially vertical section and the respective side plates further comprises a longitudinally extending connection area, and
the tub further comprises a front plate extending substantially in a lateral/vertical-plane (LVP) and connecting to the side plates in the front end of the tub, thereby forming a front wall of the tub, wherein the bottom plate and the front plate are spaced from each other along the longitudinal direction (lod) or in a vertical direction to define a gap therebetween.

2. The pallet box assembly according to claim 1, wherein the tub further comprises a lower plate vertically below the bottom plate and connecting to its lateral side portions to counter lateral expansion of the bottom plate due to forces acting on the upwardly arc-shaped portion, such as when receiving and/or transporting heavy objects.

3. The pallet box assembly according to claim 2, wherein the lower plate comprises two bent sections and two substantially vertical sections with substantially corresponding profiles to the bent sections and vertical section of the bottom plate, the respective bent sections and the vertical sections being at least partly in abutting contact.

4. The pallet box assembly according to claim 3, wherein each vertical section of the lower plate comprises a longitudinally extending connection area for connecting to a second connection area-of the vertical section of the bottom plate.

5. The pallet box assembly according to claim 1, further comprising a front lateral reinforcing beam connected to an external front end of the bottom plate or the lower plate, the front lateral reinforcing beam further comprising a protrusion extending upwards along an external side of the front plate, the protrusion configured for coming in abutting contact with the front plate when the front plate bulges forward due to heavy loads, thereby supporting the front plate.

6. The pallet box assembly according to claim 1, wherein the bottom surface and/or the side walls are constructed by a plurality of plates.

7. A pallet box assembly for receiving and transporting heavy and/or high temperature objects, the pallet box assembly having a front end and a rear end separated in a longitudinal direction (lod), the front end being adapted to receive a carrier for transporting the pallet box assembly, the pallet box assembly comprising a tub and a frame configured for receiving the tub, the frame comprising:
- at least two top rails separated in a lateral direction (lad) and extending longitudinally, and
- at least two bottom rails separated in the lateral direction (lad) and extending longitudinally,
- connecting rails connecting a respective top rail and a bottom rail, and
- lateral rails extending laterally and connecting the respective connecting rails, the tub comprising:
- at least two laterally separated side plates, the side plates extending substantially in a respective vertical/longitudinal plane (VLP), thereby forming side walls of the tub;
- a bottom plate extending in a lateral/longitudinal plane (LLP) and connecting to a bottom portion of the respective side plates, thereby forming a bottom surface of the tub;
- the bottom plate comprising two lateral side portions and at least one upwardly arc-shaped portion therebetween,
- the two side portions each comprising a lateral section connecting to the upwardly arc-shaped portion, the lateral section adapted to support the tub against the lateral rails of the frame, characterized in that
each of the two side portions further comprising:
- a bent section connecting to the lateral section, the bent section forming a longitudinally extending corner portion of the tub, and
- a substantially vertical section connecting to the bent section, the substantially vertical section reaching upwards from the bent section to align and connect to the respective side plate, wherein the substantially vertical section and the respective side plates further comprises a longitudinally extending connection area,
wherein the tub further comprises a lower plate vertically below the bottom plate and connecting to its lateral side portions to counter lateral expansion of the bottom plate due to forces acting on the upwardly arc-shaped portion, such as when receiving and/or transporting heavy objects,
wherein the tub comprises a plurality of lower plates, and wherein the tub presents a gap between each of the plurality of lower plates.

8. The pallet box assembly according to claim 1, wherein the tub is placed on the frame without being rigidly attached to the frame.

9. A pallet box assembly for receiving and transporting heavy and/or high temperature objects, the pallet box assembly having a front end and a rear end separated in a longitudinal direction (lod), the front end being adapted to receive a carrier for transporting the pallet box assembly, the pallet box assembly comprising a tub and a frame configured for receiving the tub, the frame comprising:
- at least two top rails separated in a lateral direction (lad) and extending longitudinally, and
- at least two bottom rails separated in the lateral direction (lad) and extending longitudinally,
- connecting rails connecting a respective top rail and a bottom rail, and
- lateral rails extending laterally and connecting the respective connecting rails, the tub comprising:
- at least two laterally separated side plates, the side plates extending substantially in a respective vertical/longitudinal plane (VLP), thereby forming side walls of the tub;
- a bottom plate extending in a lateral/longitudinal plane (LLP) and connecting to a bottom portion of the respective side plates, thereby forming a bottom surface of the tub;
- the bottom plate comprising two lateral side portions and at least one upwardly arc-shaped portion therebetween,
- the two side portions each comprising a lateral section connecting to the upwardly arc-shaped portion, the lateral section adapted to support the tub against the lateral rails of the frame, characterized in that
each of the two side portions further comprising:
- a bent section connecting to the lateral section, the bent section forming a longitudinally extending corner portion of the tub, and
- a substantially vertical section connecting to the bent section, the substantially vertical section reaching upwards from the bent section to align and connect to the respective side plate, wherein the substantially vertical section and the respective side plates further comprises a longitudinally extending connection area,
wherein the tub is disconnectably connected to the frame via at least one floating lock mechanism comprising a locking part of the tub, a locking part of the frame and a locking member, the floating lock mechanism providing a gap between at least one of the locking part of the tub, the locking part of the frame and the locking member, thereby allowing the tub to thermally expand without pressing against the frame.

10. The pallet box assembly according to claim 9, wherein the floating lock mechanism is placed between an upper portion of the tub and the top rails, allowing the tub to rest on the points of the floating lock mechanisms, thereby providing a vertical gap between the tub and the frame.

11. The pallet box assembly according to claim 1, wherein the frame further comprises two longitudinally extending brackets extending along an intersection of the lateral rails and the respective connecting rails, the brackets having a lateral portion supporting the tub, and a vertical portion for restricting lateral movement of the tub.

12. The pallet box assembly according to claim 11, wherein the pallet box assembly presents a lateral gap in between the tub and the vertical portions of the brackets, the lateral gap preferably being at least 0.5% of the width of the tub at a region of the bracket when the tub is unloaded.

13. A carrier system comprising a carrier and a pallet box assembly according to claim 1.

14. A method comprising the step of receiving or transporting metal mill by-products in the pallet box assembly of claim 1.

* * * * *